(12) United States Patent
Dean et al.

(10) Patent No.: US 9,195,611 B2
(45) Date of Patent: Nov. 24, 2015

(54) EFFICIENTLY UPDATING AND DELETING DATA IN A DATA STORAGE SYSTEM

(71) Applicant: Google Inc., Mountain View, CA (US)

(72) Inventors: Jeffrey Adgate Dean, Palo Alto, CA (US); Sanjay Ghemawat, Mountain View, CA (US); Andrew Fikes, Los Altos, CA (US)

(73) Assignee: GOOGLE INC., Mountain View, CA (US)

( * ) Notice: Subject to any disclaimer, the term of this patent is extended or adjusted under 35 U.S.C. 154(b) by 350 days.

(21) Appl. No.: 13/910,059

(22) Filed: Jun. 4, 2013

(65) Prior Publication Data

US 2014/0025899 A1  Jan. 23, 2014

Related U.S. Application Data

(60) Provisional application No. 61/655,463, filed on Jun. 4, 2012.

(51) Int. Cl.
*G06F 12/00* (2006.01)
*G06F 12/12* (2006.01)
*G06F 17/30* (2006.01)

(52) U.S. Cl.
CPC ........ *G06F 12/121* (2013.01); *G06F 17/30345* (2013.01); *G06F 17/30368* (2013.01)

(58) Field of Classification Search
CPC ............ G06F 12/121; G06F 17/30345; G06F 17/30368
See application file for complete search history.

(56) References Cited

U.S. PATENT DOCUMENTS

| | | | |
|---|---|---|---|
| 5,421,007 A | * | 5/1995 | Coleman et al. ............... 1/1 |
| 5,832,521 A | | 11/1998 | Klots et al. |
| 6,477,544 B1 | | 11/2002 | Bolosky et al. |
| 6,963,914 B1 | | 11/2005 | Breitbart et al. |
| 6,981,114 B1 | | 12/2005 | Wu et al. |

(Continued)

FOREIGN PATENT DOCUMENTS

| WO | WO 2011/100366 A2 | 8/2011 |
|---|---|---|
| WO | WO 2012/040391 A1 | 3/2012 |

OTHER PUBLICATIONS

Google Inc., International Search Report and Written Opinion, PCT/US2013/042063, Dec. 13, 2013, 16 pgs.

(Continued)

*Primary Examiner* — Cheng-Yuan Tseng
*Assistant Examiner* — Alan Otto
(74) *Attorney, Agent, or Firm* — Morgan, Lewis & Bockius LLP

(57) ABSTRACT

A method of storing data is disclosed. The method is performed on a data storage server having one or more processors and memory storing one or more programs for execution by the one or more processors. The data storage server receives a first and second data request, the requests including a first and second range of one or more keys and an associated first and second value respectively. The data storage server identifies one or more overlap points associated with the first range and the second range. For each of the overlap points, the data storage server then creates data items including ranges of keys, the ranges of each data item including one or more keys that are either: (a) the keys between a terminal key of the first or second range and the overlap point, or (b) the keys between two adjacent overlap points.

20 Claims, 11 Drawing Sheets

(56) References Cited

U.S. PATENT DOCUMENTS

| | | | |
|---|---|---|---|
| 7,334,004 | B2 | 2/2008 | Ganesh et al. |
| 7,430,570 | B1 | 9/2008 | Srinivasan et al. |
| 8,949,208 | B1 | 2/2015 | Xu et al. |
| 2002/0133507 | A1 | 9/2002 | Holenstein et al. |
| 2005/0015404 | A1 | 1/2005 | Cherkasova |
| 2005/0149627 | A1 | 7/2005 | Schreter |
| 2007/0016546 | A1 | 1/2007 | De Vorchik et al. |
| 2007/0183224 | A1 | 8/2007 | Erofeev |
| 2008/0243879 | A1 | 10/2008 | Gokhale et al. |
| 2008/0263305 | A1 | 10/2008 | Shu et al. |
| 2009/0070330 | A1 | 3/2009 | Hwang et al. |
| 2009/0327642 | A1 | 12/2009 | Ogihara et al. |
| 2010/0023520 | A1 | 1/2010 | Barboy et al. |
| 2010/0077165 | A1 | 3/2010 | Lu et al. |
| 2010/0281013 | A1* | 11/2010 | Graefe .......... 707/715 |
| 2011/0196664 | A1 | 8/2011 | Zunger et al. |
| 2012/0036161 | A1 | 2/2012 | Lacapra et al. |
| 2012/0159102 | A1 | 6/2012 | Kan |
| 2012/0303791 | A1 | 11/2012 | Calder et al. |
| 2013/0060742 | A1 | 3/2013 | Chang et al. |
| 2013/0318129 | A1 | 11/2013 | Vingralek et al. |
| 2013/0346365 | A1 | 12/2013 | Kan et al. |
| 2015/0012497 | A1 | 1/2015 | Clark et al. |

OTHER PUBLICATIONS

Google Inc., International Search Report and Written Opinion, PCT/US2013/044105, Nov. 14, 2013, 6 pgs.
Google Inc., International Preliminary Report on Patentability, PCT/US2013/044105, Dec. 9, 2014, 4 pgs.
Google Inc., International Preliminary Report on Patentability, PCT/US2013/044163, Dec. 9, 2014, 9 pgs.
Bernstein, Chapter 5—Multiversion Concurrency Control, Concurrency Control and Recovery in Database Systems, Jan. 1, 1987, 24 pgs.
Elmasri, Chapter 20—Physical Database Design and Tuning, Fundamentals of Database Systems, 6th Ed., Addison-Wesley, Jan. 1, 2011, 16 pgs.
Garcia-Molina, Chapter 18—Concurrency Control, Database Systems: The Complete Book, Prentice-Hall, Jan. 1, 2002, 72 pgs.
Garcia-Molina, Chapter 1—The Worlds of Database Systems, Database Systems: The Complete Book, Prentice Hall, Jan. 1, 2002, 21 pgs.
Google Inc., International Search Report and Written Opinion, PCT/US2013/044163, May 9, 2014, 11 pgs.
Zhang, Supporting Multi-Row Distributed Transactions with Global Snapshot Isolation Using Bare-Bones Hbase, 11th IEEE/ACM Int'l Conf. on Grid Computing, Piscataway, NJ, Oct. 25, 2010, pp. 177-184.
Ghemawat, The Google File System, Proc. of the ACM Symposium on Operating Systems Principles, Oct. 19, 2003, pp. 1-15.
Ivanova, Self-Organizing Strategies for a Column-Store Database, Proc. of the 11th International Conference on Extending Database Technology Advances in Database Technology, EDBT'08, Mar. 25, 2008, pp. 157-168.
Google Inc., Invitation to Pay Additional Fees, PCT/US2013/042063, Jul. 30, 2013, 8 pgs.

* cited by examiner

EFFICIENTLY UPDATING AND DELETING DATA IN A DATA STORAGE SYSTEM

RELATED APPLICATIONS

This application claims priority to U.S. Provisional Application No. 61/655,463, filed Jun. 4, 2012, entitled "Efficiently Updating and Deleting Data in a Data Storage System," which is incorporated by reference herein in its entirety.

TECHNICAL FIELD

The disclosed implementations relate generally to updating data stored in a data storage system.

BACKGROUND

Systems storing a large amount of data must efficiently store, update, and retrieve the data in order to be useful. Some such systems employ a distributed data storage system that uses a plurality of servers to allow even a large number of geographically diverse users to easily update and retrieve data. When a request to store, update, or delete stored data is received the request is routed to the appropriate server. The data then changed in accordance with the request. Some requests will alter only a single data value, while others will request to alter a large range of data values.

In addition, data storage systems may find it useful to provide historical information for a particular piece of data. Historical data allows changes in a particular piece of data to be tracked over time. Depending on the amount and quality of stored historical information, it may be possible to determine the exact value of particular data at a specific point in the past. Thus, storing this historical data necessitates a large amount of historical data storage. The data storage system must be able to efficiently store historical data information for the data storage system to be useful and cost effective. Techniques which improve the efficiency of adding, storing, and removing data from a data storage system greatly improve the usefulness of such systems.

SUMMARY

In accordance with some implementations, a method of storing data is disclosed. The method is performed on a data storage server having one or more processors and memory storing one or more programs for execution by the one or more processors. The data storage server receives a first data request, the request including a first range of one or more keys and an associated first value. The data storage server then receives a second data request, the request including a second range of one or more keys and an associated second value. The data storage server determines whether the first range overlaps, at least in part, the second range. In accordance with a determination that the first range overlaps, at least in part, the second range, the data storage server identifies one or more overlap points associated with the first range and the second range. For each of the identified overlap points, the data storage server then creates respective data items including respective ranges of keys, the respective ranges of each respective data item including one or more keys that are either: (a) the one or more keys between a terminal key of the first or second range and the overlap point, or (b) the one or more keys between two adjacent overlap points. The data storage server then stores the created data items in the memory, wherein all the keys included in the first and second data requests are included in one of the created data items.

In accordance with some implementations, a method for data storage and retrieval is disclosed. The method is performed on a data storage server having one or more processors and memory storing one or more programs for execution by the one or more processors. The data storage server stores one or more immutable data files, each immutable data file including one or more key ranges, and each key range including one or more keys and an associated value. In response to receiving a data request, the data storage server reads one or more respective key ranges out of each immutable file in the one or more immutable files and stores the respective key ranges in memory. The data storage server then identifies, for all the respective key ranges, overlap points that identify, in one or more key ranges, keys that overlap with keys in other key ranges. The data storage server creates one or more data items, each data item including a range of one or more keys, each range including one or more keys that are either 1) the one or more keys between two overlap points, 2) the one or more keys between a terminal key of a key range and an overlap point, or 3) the one or more keys between two terminal keys of a single key range, such that the none of the created data items include any overlap points. For each respective created data item the data storage server determines whether the respective created data item key range matches the key range of another created data item. In accordance with a determination that the respective created data item key range matches the key range of another created data item, the data storage server removes the older data item. The data storage server determines whether any other data item has a key range which is adjacent to the key range of the respective data item. In accordance with a determination that a second data item has a key range adjacent to the key range of the respective data item; the data storage server determines whether a value associated with the key ranges in the respective created data item and a value associated with the key ranges in the identified second created data item are the same. In accordance with a determination that the value associated with the key ranges in the respective created data item is the same as the value associated with the key ranges in the identified second created data item, the data storage server merges the respective data item and the identified second data item into a single data item including a key range covering the combined key ranges of both data items.

In accordance with some implementations, a system for storing data is disclosed. The system has one or more processors and memory storing one or more programs to be executed by the one or more processors. The one or more programs include instructions which cause the system to receive a first data request, the request including a first range of one or more keys and an associated first value. The system then receives a second data request, the request including a second range of one or more keys and an associated second value. The system determines whether the first range overlaps, at least in part, the second range. In accordance with a determination that the first range overlaps, at least in part, the second range, the system identifies one or more overlap points associated with the first range and the second range. For each of the identified overlap points, the system then creates respective data items including respective ranges of keys, the respective ranges of each respective data item including one or more keys that are either: (a) the one or more keys between a terminal key of the first or second range and the overlap point, or (b) the one or more keys between two adjacent overlap points. The system then stores the created data items in the memory, wherein all the keys included in the first and second data requests are included in one of the created data items.

In accordance with some implementations, a system for data storage and retrieval is disclosed. The system has one or more processors and memory storing one or more programs to be executed by the one or more processors. The one or more programs include instructions which cause the system to store one or more immutable data files, each immutable data file including one or more key ranges, and each key range including one or more keys and an associated value. In response to receiving a data request, the system reads one or more respective key ranges out of each immutable file in the one or more immutable files and stores the respective key ranges in memory. The system then identifies, for all the respective key ranges, overlap points that identify, in one or more key ranges, keys that overlap with keys in other key ranges. The system creates one or more data items, each data item including a range of one or more keys, each range including one or more keys that are either 1) the one or more keys between two overlap points, 2) the one or more keys between a terminal key of a key range and an overlap point, or 3) the one or more keys between two terminal keys of a single key range, such that the none of the created data items include any overlap points. For each respective created data item the system determines whether the respective created data item key range matches the key range of another created data item. In accordance with a determination that the respective created data item key range matches the key range of another created data item, the system removes the older data item. The system then determines whether any other data item has a key range which is adjacent to the key range of the respective data item. In accordance with a determination that a second data item has a key range adjacent to the key range of the respective data item; the system determines whether a value associated with the key ranges in the respective created data item and a value associated with the key ranges in the identified second created data item are the same. In accordance with a determination that the value associated with the key ranges in the respective created data item is the same as the value associated with the key ranges in the identified second created data item, the system merges the respective data item and the identified second data item into a single data item including a key range covering the combined key ranges of both data items.

In accordance with some implementations, a non-transitory computer readable storage medium storing one or more programs configured for execution by a data storage server system is disclosed. The one or more programs include instructions which cause the system to receive a first data request, the request including a first range of one or more keys and an associated first value. The system then receives a second data request, the request including a second range of one or more keys and an associated second value. The system determines whether the first range overlaps, at least in part, the second range. In accordance with a determination that the first range overlaps, at least in part, the second range, the system identifies one or more overlap points associated with the first range and the second range. For each of the identified overlap points, the system then creates respective data items including respective ranges of keys, the respective ranges of each respective data item including one or more keys that are either: (a) the one or more keys between a terminal key of the first or second range and the overlap point, or (b) the one or more keys between two adjacent overlap points. The system then stores the created data items in the memory, wherein all the keys included in the first and second data requests are included in one of the created data items.

In accordance with some implementations, a non-transitory computer readable storage medium storing one or more programs configured for execution by a data storage server system is disclosed. The one or more programs include instructions which cause the system to store one or more immutable data files, each immutable data file including one or more key ranges, and each key range including one or more keys and an associated value. In response to receiving a data request, the system reads one or more respective key ranges out of each immutable file in the one or more immutable files and stores the respective key ranges in memory. The system then identifies, for all the respective key ranges, overlap points that identify, in one or more key ranges, keys that overlap with keys in other key ranges. The system creates one or more data items, each data item including a range of one or more keys, each range including one or more keys that are either 1) the one or more keys between two overlap points, 2) the one or more keys between a terminal key of a key range and an overlap point, or 3) the one or more keys between two terminal keys of a single key range, such that the none of the created data items include any overlap points. For each respective created data item the system determines whether the respective created data item key range matches the key range of another created data item. In accordance with a determination that the respective created data item key range matches the key range of another created data item, the system removes the older data item. The system then determines whether any other data item has a key range which is adjacent to the key range of the respective data item. In accordance with a determination that a second data item has a key range adjacent to the key range of the respective data item; the system determines whether a value associated with the key ranges in the respective created data item and a value associated with the key ranges in the identified second created data item are the same. In accordance with a determination that the value associated with the key ranges in the respective created data item is the same as the value associated with the key ranges in the identified second created data item, the system merges the respective data item and the identified second data item into a single data item including a key range covering the combined key ranges of both data items.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Figure 1:
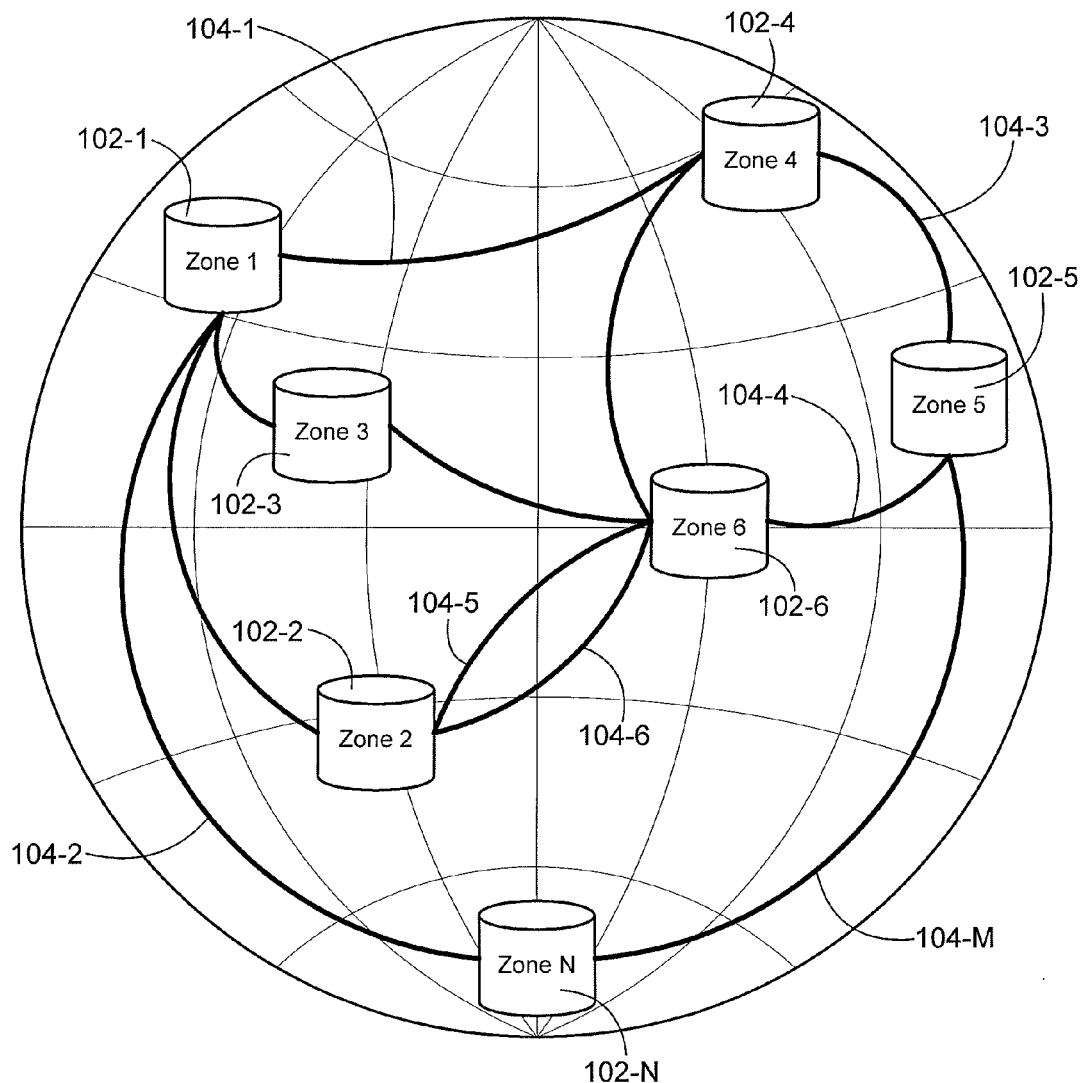
FIG. 1 is a block diagram illustrating a distributed storage system, according to some implementations.

In some implementations, a data storage system is implemented as a distributed storage system. Data is stored as a series of key value pairs. For example, key 1 (k1) may be assigned the value "chocolate." Data is requested by specifying a key value (for example: k1), and the value associated with the specified key is returned (chocolate). In some implementations, values are associated with a single key in a point value system. In such a system, each key is stored separately with its accompanying associated value. As such, even when a large number of keys have the same value, all the keys are stored individually. In some implementations, values are associated with a range of keys, rather than with a specific key. So, for example, if keys 1-35 (k1-k35) all have the value "ice cream," this data could be stored as a range of keys with an associated value. One possible representation for key range storage could be [k1, k35]→"ice cream."

In some implementations key ranges are stored by including the last key in the range and a delta value indicating the offset to the beginning of the range. For example, a key range which goes from k4 to k12 and has the value "frosting" associated with it may be represented as [k12, −8]→"frosting."

In some implementations storing ranges of keys, instead of individual keys, allows more data to be stored more quickly and using less storage space than point value storage. When a request is received for a key within the range stored the value associated with the entire range is returned. In some implementations a data storage system is able to use both key ranges and key point values. Additionally, in some implementations, key ranges can be used which only cover one key. For example, a first key (k1) whose associated value was chocolate is stored as the following range [k1, k1]→"chocolate." Thus, a key value pair data storage system is able to use only key point values, only range key values, or, in some implementations, a combination of both. Storing keys as ranges reduces the number of writes performed by the server when adding data to the system and reduces the number of reads necessary when performing a merge associated with a read or compaction. As such, in specific systems and for specific tasks representing all key values as ranges is beneficial.

In some implementations, the key value pairs are stored in immutable data tables. The data that populates these tables is first collected in a data storage buffer in system memory. As the data storage system receives requests to add, modify, or delete data from the system, these requests are collected in a data storage buffer. In some implementations the data requests are first recorded in a data storage log, which keeps a history of the various received data requests. The data storage buffer collects and stores the information from the data storage requests.

In some implementations, each data request includes date or time information (such as a time stamp) which represents when the request was originated. The buffer uses this information to determine what the most recent value for a given key is. In some implementations, only the most recent key for a particular data value is retained. In other implementations, past values for a given key are retained to allow previous values for the key to be determined. The number of previous values that are retained is determined by the policies associated with the system. In some implementations the policies specify a specific time to record values (e.g. all values for the last 24 hours). Other implementations would specify a particular number of past values (for example, the last 10 values for a given key).

In some implementations, a value assigned to a key or range of keys is a deletion marker. A deletion marker indicates that the particular key has been deleted. In some implementations, when a deletion marker is received, the key and all its previous values are removed from the data storage buffer. In other implementations, the previous values for the key remain, but are masked by the deletion marker. In this case, any request to read the data stored at this key would simply result in a response that the key had been deleted.

In some implementations, when a given criteria is met, the data in the data storage buffer is written out to an immutable data table. In some implementations, the criteria are based on a predetermined amount of time (e.g. every 10 minutes). In other implementations the criteria are based on the amount of data stored (e.g. 80 percent of the buffer's total capacity). Once written, the immutable data file or table can no longer be altered.

In some implementations, multiple such immutable data tables will exist for particular set of data. Not all immutable data files or tables will include value information for all keys or ranges of keys. Furthermore, only one immutable data file or table will contain the most current value for a given key. As such, when a request to read data from the data storage system is received, it is necessary to construct a merged view of the multiple different immutable data tables.

In some implementations, creating a merged view of a set of immutable data tables includes reading all the key ranges out of each immutable data table. The key ranges are then analyzed, and overlap points between every key range are identified. For example, for the following three key ranges [k1, k6]→a, [k5, k12]→b, and [k9, k9]→c, overlap points are identified at k4, k6, and k8, and k9. The ranges are then split at the identified overlap points to result in the following list of ranges: [k1, k4]→a, [k5, k6]→a, b, [k7, k8]→b, [k9, k9]→b, c, [k10, k12]→c. In some implementations only the most recent value associated with a given key range is retained. In other implementations multiple values are retained for keys that were originally associated with more than one value and date and time information for the multiple values is retained.

In some implementations the new ranges are analyzed to determine whether any of the new key ranges have the same key range as another new key range. For example, if two of the new key ranges have the values [k2, k2]→chocolate and [k2, k2]→ice cream, the system will determine that these two key ranges have the same range. In some implementations, only the key range with the most recent date/time information will be retained. In other implementations, the two ranges will be merged and both values will be retained. In such a case, date/time information for both key ranges is maintained.

In some implementations the data storage system will then determine whether any of the remaining key ranges have ranges that are adjacent to the other. For example, for the ranges [k1, k5]→a, [k7, k9]→DEL (the delete marker), and [k10, k15]→DEL, the data storage server will determine that [k7, k9] is adjacent to [k10, k15], but not [k1, k5]. In some implementations, the data storage server will then determine whether the values associated with adjacent ranges are the same. In accordance with a determination that the values are the same (in the above example, both [k7, k9] and [k10, k15] are associated with the delete marker) the two adjacent ranges will be merged. In our above example, the resulting group of ranges will be [k1, k5]→a and [k7, k15]→DEL, because the ranges [k7, k9] and [k10, k15] have been merged.

In some implementations, once the key ranges from the multiple immutable data files or tables have been merged into a signal merged view, the requested operation can be carried out. For example, in response to a read request, the value associated with the requested key can be returned.

In some implementations, the number of immutable data files or tables for a given data set meets some predetermined criteria. This criteria includes a predetermined length of time, a receiving a specific signal from the overall managing system, or a predetermined amount of data stored. In response to determining this criteria is met, the data storage server will perform a compaction operation, which merges current immutable data tables and replaces them with a new immutable date file or table that includes the most recent values for the included key ranges. In some implementations, the new immutable data file or table also includes historical data information that represents past values associated with the key ranges. In some implementations the historical data information is not stored in the new immutable data file or table but is still retained in another part of the data storage system. Thus, a normal read will not result in access to the historical information, but if that specific information is requested it is can be retrieved.

In some implementations, the process of fulfilling a compaction operation includes producing a merged view of the data, as described above. Once a merged view of the data is obtained, the merged data is written out to a new immutable data table and the old immutable data tables are deleted. In some implementations, if the most recent value for a key range is a deletion marker, the key range is removed from the data storage server altogether and is not represented din the new immutable data file or table.

FIG. 1 is a block diagram illustrating a distributed storage system 100, according to some implementations. The distributed storage system 100 includes a plurality of zones 102-1, 102-2, ... 102-N at various locations across the world, connected by network communication links 104-1, 104-2, ... 104-M. In some implementations, a zone (such as the zone 1 102-1) corresponds to one or more data centers that are geographically close to each other. For example, the North American region may correspond to one zone that includes two data centers, one located near the Pacific Coast and the other one located near the Atlantic Coast. Although the conceptual diagram of FIG. 1 shows a limited number of network communication links 104-1, etc., typical implementations would have many more network communication links.

In some implementations, there are two or more network communication links between the same pair of zones, as illustrated by links 104-5 and 104-6 between the zone 2 (102-2) and the zone 6 (102-6). In some implementations, the network communication links are composed of fiber optic cable. In some implementations, some of the network communication links use wireless technology, such as microwaves. In some implementations, each network communication link has a specified bandwidth and/or a specified cost for the use of that bandwidth. In some implementations, each zone maintains the statistic information about the transfer of data across one or more of the network communication links within the distributed storage system 100, including throughput rate, times of availability, reliability of the links, etc.

Figure 2:
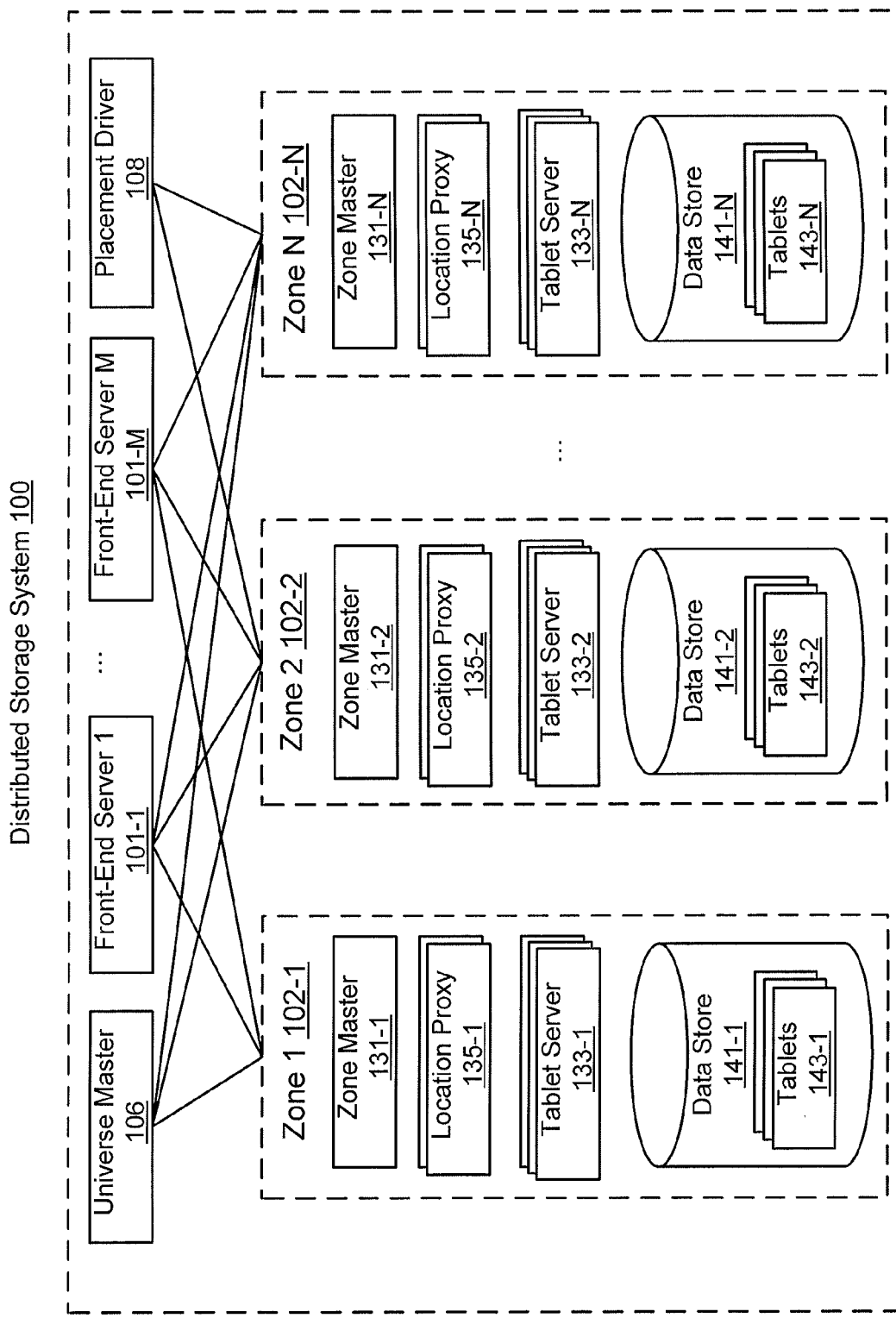
FIG. 2 is a block diagram illustrating components of the distributed storage system, according to some implementations.

FIG. 2 illustrates the components of the distributed storage system 100, according to some implementations. The distributed storage system 100 includes a universe master 106, one or more front-end servers (101-1, ..., 101-M), a placement driver 108, and a plurality of zones (102-1, 102-2, ..., 102-N). The universe master 106 and the placement driver 108 are responsible for monitoring the performance of the system 100 and controlling the data replication/migration between two zones. A zone (102-1, 102-2, ..., 102-N) typically includes a data store (141-1, 141-2, ..., 141-N) hosting a plurality of tablets (143-1, 143-2, ..., 143-N), and utilizes a cluster of computer servers, including a zone master (131-1, 131-2, ..., 131-N), one or more location proxies (135-1, 135-2, ..., 135-N), one or more tablet servers (133-1, 133-2, ..., 133-N) to perform all of the tablet-related tasks. The data store (141-1, 141-2, ..., 141-N) provides the underlying persistent storage space for data managed by a corresponding zone (102-1, 102-2, ..., 102-N).

In some implementations, data within the data store (141-1, 141-2, ..., 141-N) are organized into many tablets, which is a basic data unit handled within a particular zone. The zone master (131-1, 131-2, ..., 131-N) is responsible for assigning each tablet in the data store (141-1, 141-2, ..., 141-N) to one of the tablet servers (133-1, 133-2, ..., 133-N) for handling read/write requests directed at the tablet based, at least in part, on the CPU and memory usage at the tablet servers. For example, when the zone master determines that one tablet server is overloaded, it may orchestrate the migration of some tablets from this overloaded tablet server to other tablet servers in the same zone or maybe even another zone. A location proxy provides a location-lookup service to another entity (e.g., a front-end server or a tablet server) such that, for a given tablet, the location proxy identifies a respective tablet server that has been chosen for handling the read and write requests directed at the tablet.

Figure 3:
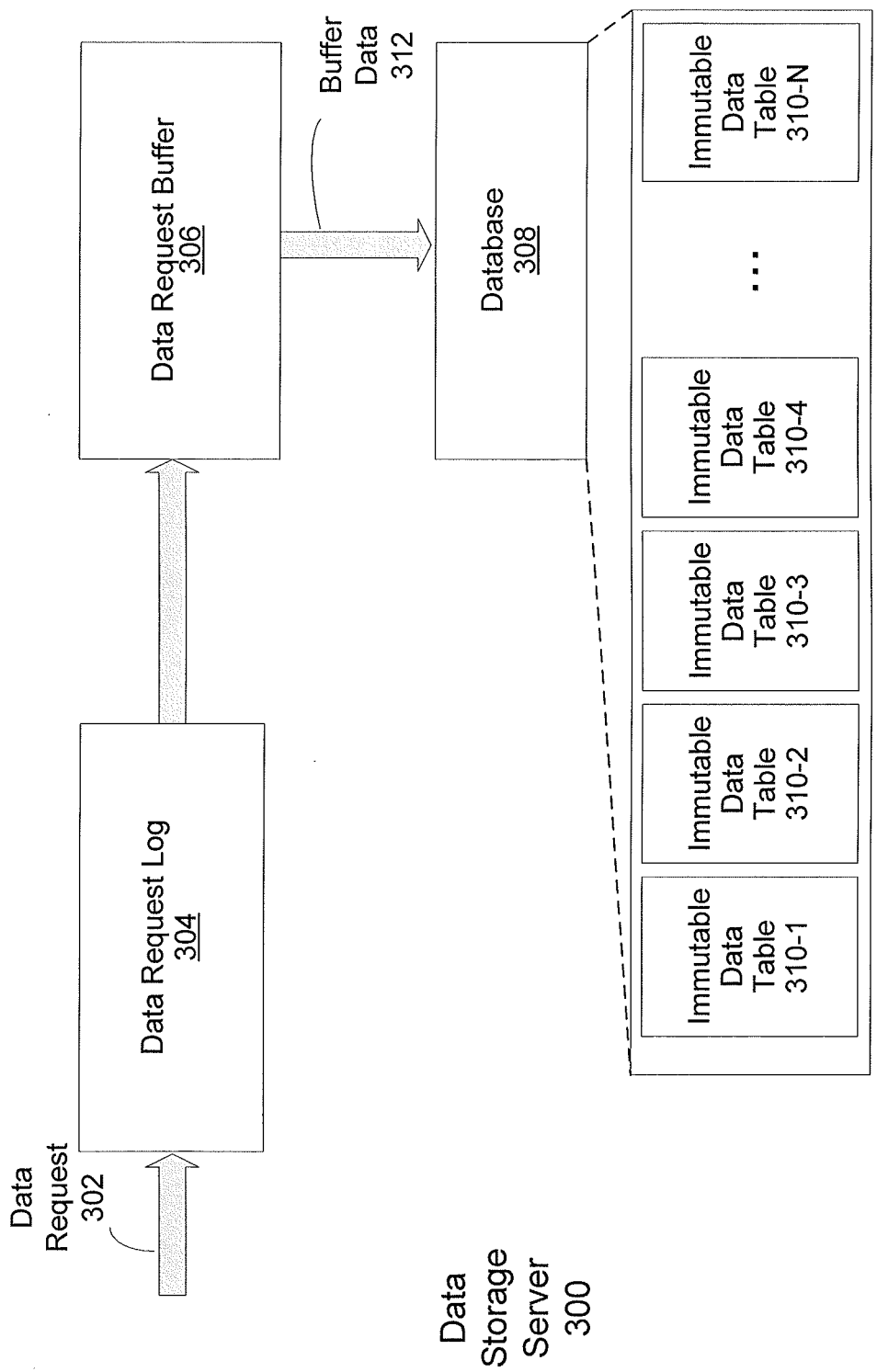
FIG. 3 is a block diagram illustrating the components of a data storage server, according to some implementations.

FIG. 3 is a block diagram illustrating the components of a data storage server 300, according to some implementations. In this example the data storage server 300 includes a data request log 304, a data request buffer 306, and a data storage database 308 for storing one or more immutable data tables 310.

In accordance with some implementations, the data storage server 300 receives a data request 302. In some implementations the data request is a data read request (which is a request to retrieve specific data from the data storage server). A data read request includes the key value corresponding to the desired data value and a time or date indicator that specifies a specific or date for which the user is requesting the value. In some implementations, the request time or date is the current time or date, and the request is for the most recent value associated with the requested key. In other implementations, the read requests will request the value stored at a particular key at a point in the past.

In some implementations, the data request 302 is a data update request to add, delete, or modify data in the data storage database 300. A data update request includes a key value to be added, deleted, or modified, the value to be updated, and time/date information indicating when the data update request originated.

In some implementations the data request 302 is sent to the data request log 304. The data request log 304 includes a log of the various data requests 302 received at the data storage server 300 over a period of time. In some implementations the data request log maintains a record for all requests over a predetermined period of time. In other implementations the data request log stores a predetermined amount of data instead of all data for a predetermined amount of time. In some implementations, only data requests 302 to add, delete, or modify data are recorded, and data read requests are not.

In some implementations, the data request 302 is the passed to the data request buffer 306. The data request buffer stores, in system memory, data requests 302 and the data associated with the requests. The data request buffer 306 stores a plurality of data requests 302 over time. As new data requests 302 are received, the data stored in the data request buffer is updated and optimized. In some implementations, the data request buffers stores only the most recent value for a particular key value. In other implementations, the data request buffer stores a predetermined number of values for a particular key over time.

In some implementations, once particular criteria is met, the data in the data request buffer 306 is written into an immutable data table 310 stored in a database 308. The data is then removed from the data request buffer 306. In some implementations the particular criteria is based on a predetermined amount of time passing. For example, the data stored in the data buffer is written out to an immutable data file 310 every 10 minutes. In other implementations the criteria for writing the data request buffer 306 to an immutable data table 310 is a certain amount of data being stored in the data request buffer 306. For example, the data request buffer 306 is configured to write its data out to an immutable data table when the buffer is 75 percent full. Once the buffer data 312 is written to a database 308 it is stored in an immutable data table 310.

In some implementations, the database 308 stores a plurality of immutable data tables 310-1-310-N. Each immutable data table 310 stores buffer data 312 received from the data request buffer 306 in the past. Each immutable data table 310 includes a plurality of key values or key value ranges and values associated with the key values or key value ranges. Each immutable data table 310 also includes date/time information with respect to the data stored in the immutable data table 310.

Figure 4:
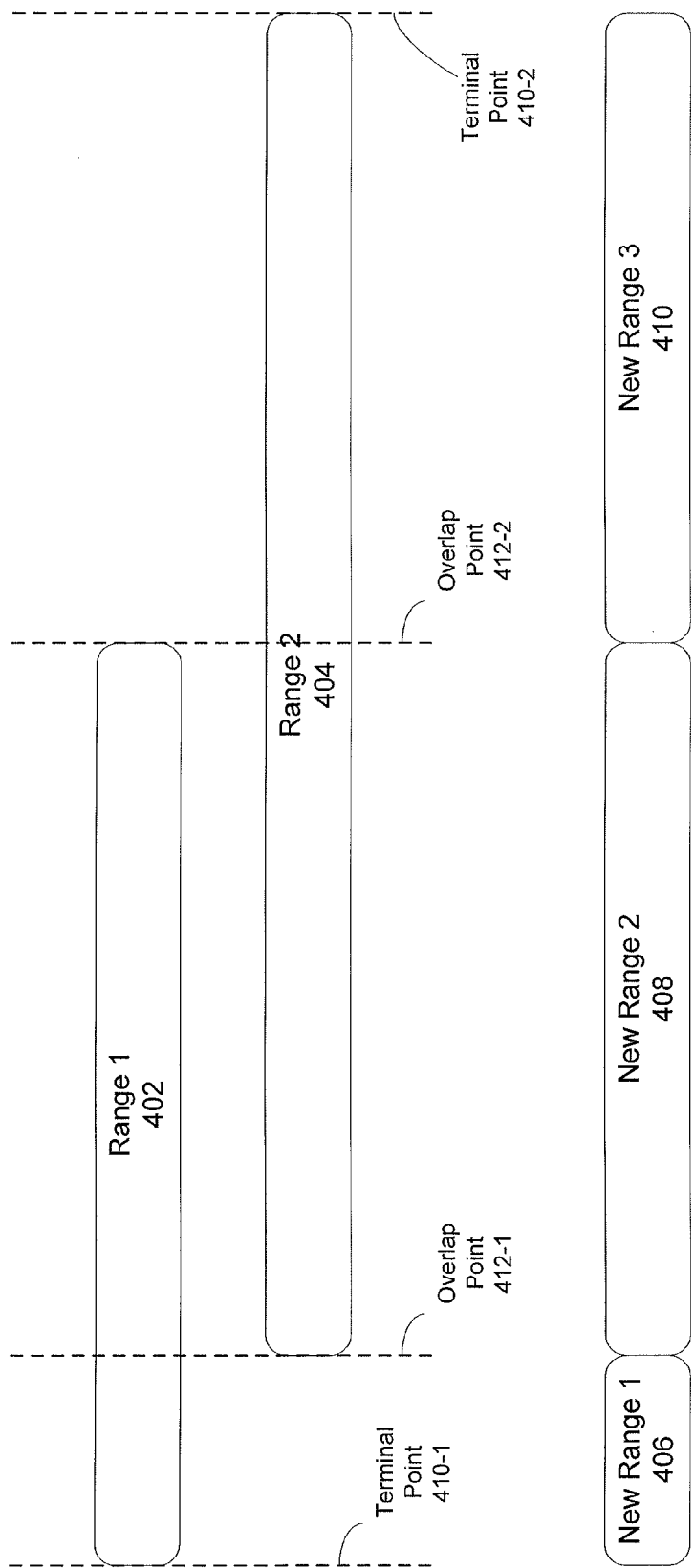
FIG. 4 is a block diagram that illustrates the process of resolving overlaps between two data ranges according to some implementations.

FIG. 4 illustrates the process of resolving overlaps between two data ranges according to some implementations. In accordance with some implementations a first range 402 and a second range 404 need to be reconciled before they are saved. In some implementations, the first range 402 is received from a user request and the second range 404 is already stored in the data request buffer (FIG. 3, 306). In other implementations both ranges of keys are received from two immutable data tables (FIG. 3, 310) that are being merged.

In some implementations, the first range 402 and second range 404 are compared to determine whether the key range of the first range 402 overlaps at any point with the key range of the second range 404. In accordance with a determination that the first range of keys 402 overlaps with the second range of keys 404, the data storage server (FIG. 3, 300) determines the overlap points (412-1 and 412-2) of the two ranges. For example, if the first range 402 includes keys k1-k7 and the second range includes keys k4-k12, the overlap points 412 will be determined to be at k3 and k7.

In some implementations the data storage server (FIG. 3, 300) then divides the first range 402 and second range 404 into key ranges that do not overlap. The data storage server (FIG. 3, 300) then creates new data items (406, 408, and 410) to store the new data ranges. The new data items (406, 408, and 410) store key ranges such that none of the new data item key ranges has any overlap with any other new data item key ranges. This can be accomplished in a variety of ways. For example, the data storage server (FIG. 3, 300) beginning splitting up the old key ranges to form new data items and starts at terminal point 410-1 in the first range. All the keys from the first terminal point 410 to the next overlap point 412-1 are then stored in a first new data item 406 representing the new range. The second data item 408 includes the keys between the first overlap point 412-1 and the second overlap point 412-2. The third new data item 410 is includes keys from the overlap point 412-2 to the terminal point 410-2. So, if the first range includes keys k1-k7 and the second range includes keys k4-k12, the first new data item 406 includes keys k1-k3, the second new data item 408 includes keys k4-k7, and the third new data item 410 includes keys k8-k12.

In some implementations, the first range 402 and a second range 404 include a value associated with all the key values in the range. For new data items that include keys that came from only one original range (for example the first new data item 406 includes only keys from the original first range 402 and the third new range 410 includes only key from the original second range 404) include the value originally associated with the range from which the keys were received. For new data items that include keys that overlapped multiple ranges, the data storage server (FIG. 3, 300) must determine which value to associate with the new range. In some implementations, the system determines, based on associated date/time information, the most recent value and associates the new key range with that value. In other implementations, both values are associated with the new range and include their respective date/time information.

Figure 5:
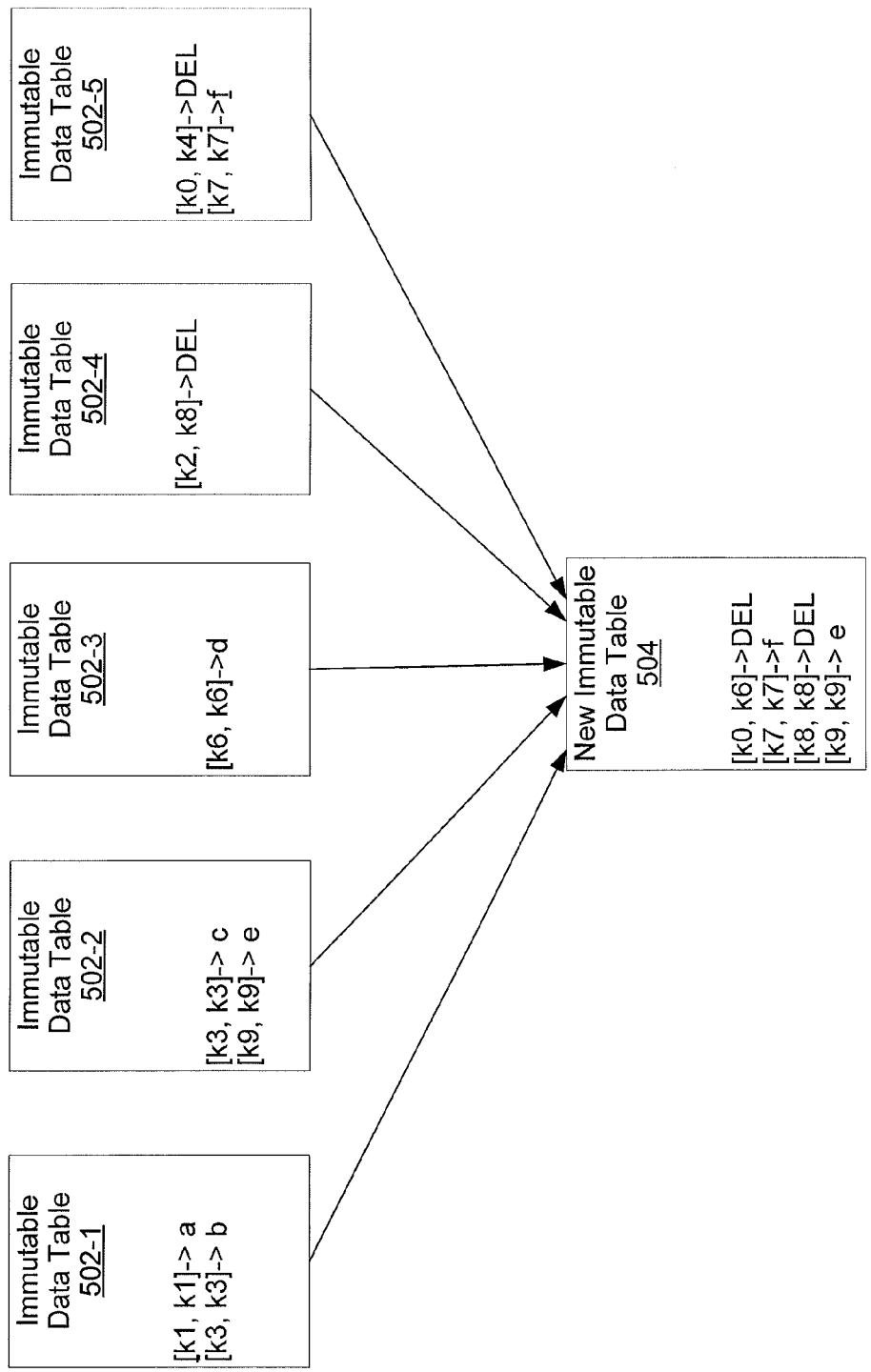
FIG. 5 is a block diagram illustrating a merging of multiple immutable data files into a single, new immutable data file according to some implementations.

FIG. 5 is a block diagram illustrating a merging of multiple immutable data files into a single, new immutable data file according to some implementations. The immutable data files store one or more key ranges and an associated value. In some implementations each key range in an immutable data file 502 has associated date or time information. In some implementations even key ranges which only cover a single key are still represented as a range. For example, the range [k6, k6] only covers a single key, but is still represented as a range. In some implementations both ranges and point values (which are represented as a single key, not a range) are both represented in a given immutable data file 502.

In some implementations the value stored associated with a key range is a deletion marker. In some implementations the ending point of a range is stored in the entry for a range of keys. Within a given immutable data table 502 the key range values are ordered by the value of the last key in the key range.

In some implementations, the data storage server (FIG. 3, 300) receives a read or compaction request. When a read request is received by the data storage server, (FIG. 3, 300) the data storage server (FIG. 3, 300) must resolve the various changes to the data over time that are recorded on the applicable immutable data tables (502-1 to 502-5) by merging the applicable immutable data tables (502-1 to 502-5) to produce a temporary merged view. In some implementations the data storage server (FIG. 3, 300) receives a compaction request. A compaction request is a request to permanently merge the plurality of immutable data tables 502 into a single new immutable data table 504. This compaction request serves to reduce the total amount of immutable data tables 502 stored on the data storage server (FIG. 3, 300).

In some implementations, in response to either a read request or a compaction request, the data storage server (FIG. 3, 300) merges the data on a plurality of immutable data files (502-1 to 502-5) to a single merged view table. In some implementations this process begins by collecting all the data ranges from all the applicable immutable data tables 502 into a single table in memory. The key ranges are then checked to determine all overlap points. The key ranges are then split at each overlap point. For example, for the ranges shown in immutable data tables 1-5 (502-1 to 502-5) of FIG. 5, the resulting split up key ranges would be as follows:

[k0, k0]→DEL
[k1, k1]→a
[k1, k1]→DEL
[k2, k2]→DEL
[k2, k2]→DEL
[k3, k3]→b
[k3, k3]→c
[k3, k3]→DEL
[k4, k4]→DEL
[k4, k4]→DEL
[k5, k5]→DEL
[k6, k6]→d
[k6, k6]→DEL
[k7, k7]→DEL
[k7, k7]→f
[k8, k8]→DEL
[k9, k9]→e

In some implementations, the data storage server (FIG. 3, 300) then compares the ranges of each key range entry to determine any key range entries that have the same range of key values. In the above example, [k7, k7,]→DEL and [k7, k7]→f both have the same range of key values. When two key range entries are determined to have the same key range, the data storage server then determines which entry (and associated value) is more recent. In some implementations the most recent value is associated with the key range and the other values are dropped. For example, the above data set would now be as follows:

[k0, k0]→DEL
[k1, k1]→DEL
[k2, k2]→DEL
[k3, k3]→DEL
[k4, k4]→DEL
[k5, k5]→DEL
[k6, k6]→DEL
[k7, k7]→f
[k8, k8]→DEL
[k9, k9]→e

In some implementations each entry has associated time/date information that show the time of origin. In other implementations, the date/time information is associated with each original immutable data file 502, not with individual entries. In some implementations the most recent entry is kept and all previous entries are removed. In other implementations, the older key value information is stored as history data for the more recent value.

In some implementations, once the entries with the same ranges are resolved, the data storage server (FIG. 3, 300) determines whether any of the remaining entries have key ranges that are adjacent. For example, an entry with a key range [k2, k5] is adjacent to an entry with key range [k6, k10], but not adjacent to an entry with the key range [k7, k9]. The values associated with adjacent ranges are compared. Any adjacent ranges with the same associated values are merged into a single range. For example, after merging adjacent ranges with the same associated values, the above data set is as follows:

[k0, k6]→DEL
[k7, k7]→f
[k8, k8]→DEL
[k9, k9]→e

In some implementations, the resulting data is stored as a temporary merged view, from which data is retrieved. In other implementations, the resulting data is saved as a new immutable data table 504 and the input immutable data tables (502-1 to 502-5) are removed from the data storage server (FIG. 3, 300).

In some implementations the merge described above is implemented by keeping track of one child iterator per immutable data table being merged together. Each child iterator points at a key range stored in the corresponding immutable data table and supports advancing through the key ranges stored in that immutable data table. The previously described overlap detection and key range fragmentation and resolution algorithm is used to resolve the key ranges currently pointed to by each of the child iterators. When a child iterator's current range has been fully consumed (i.e., all fragments of the child range have either been yielded by the merged view, or dropped because of a more recent value), the child iterator is advanced to its next key range.

In some implementations, the data storage server (FIG. 3, 300) resolves a read command by advancing the merge function forward and beginning at the first range whose ending key is greater than or equal to the request key value. By beginning the merge at this point, we more efficiently resolve the read without having to merge the entire stored ranges.

Figure 6:
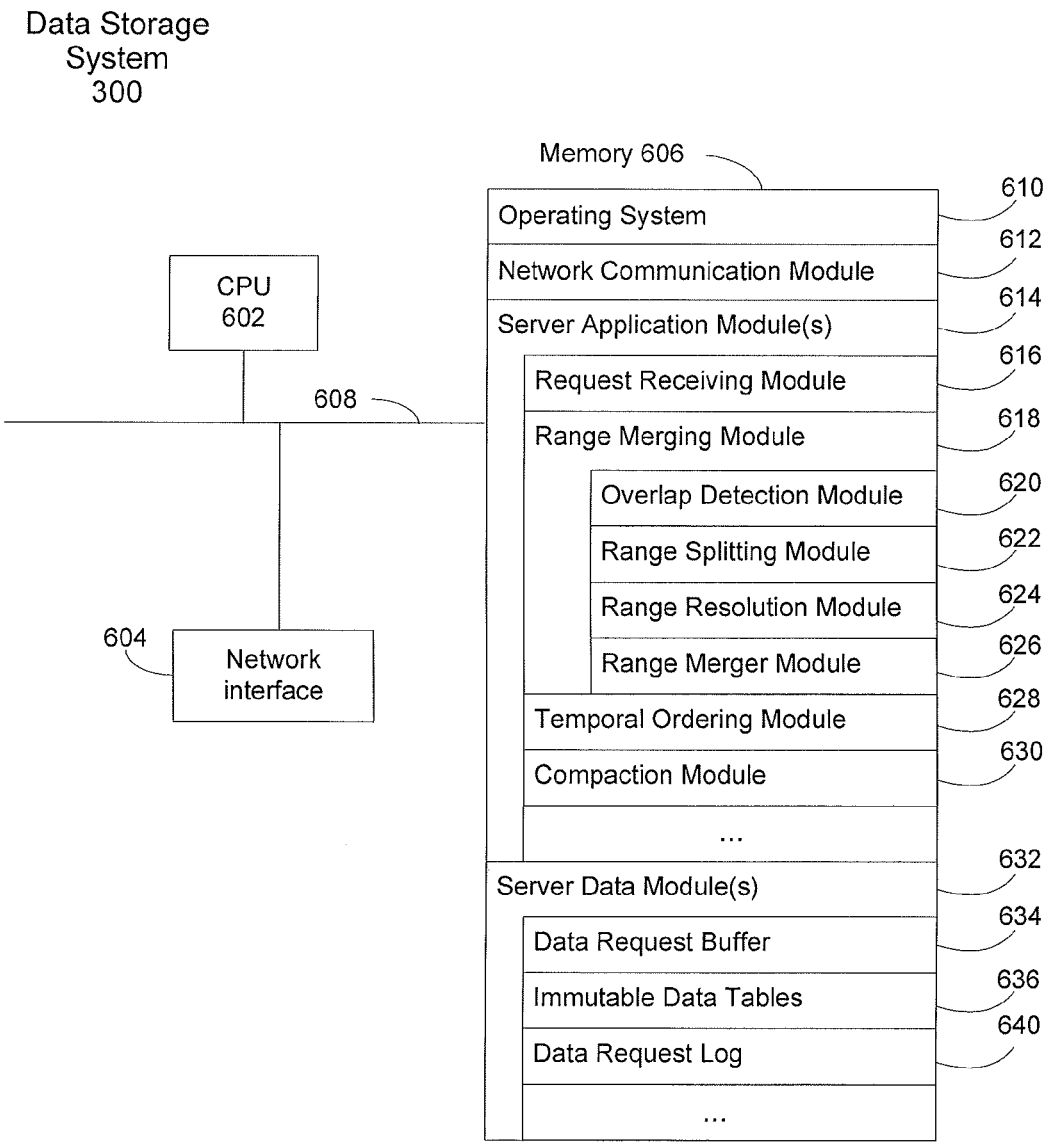
FIG. 6 is a block diagram illustrating a server system 120, in accordance with some implementations.

FIG. 6 is a block diagram illustrating a data storage server 300, in accordance with some implementations. The data storage server 300 typically includes one or more processing units (CPU's) 602, one or more network interfaces 604, memory 606, and one or more communication buses 608 for interconnecting these components.

Memory 606 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 606 may optionally include one or more storage devices remotely located from the CPU(s) 602. Memory 606, or alternately the non-volatile memory device(s) within memory 606, includes a non-transitory computer readable storage medium. In some implementations, memory 606 or the computer readable storage medium of memory 606 stores the following programs, modules and data structures, or a subset thereof:

- an operating system 610 that includes procedures for handling various basic system services and for performing hardware dependent tasks;
- a network communication module 612 that is used for connecting the server system 120 to other computers via the one or more communication network interfaces 304 (wired or wireless) and one or more communication networks, such as the Internet, other wide area networks, local area networks, metropolitan area networks, and so on;
- one or more server application module(s) 614 for enabling the data storage server 300 to perform the functions offered by the data storage server 300, including but not limited to:
  - a request receiving module 616 for receiving data requests, including requests to add data, modify data, and delete data at the data storage server 300 as well as requests to read the values associated with a specific key or range of keys;
  - a range merging module 616 for merging a two or more key ranges such that the most recent value for any key can be found, the range merging module including but not limited to:
    - a overlap detection module 620 for detecting overlap between two or more key ranges; wherein overlap includes any time a specific key is included in more than one key range and marking overlap points;

a range splitting module 622 for splitting ranges into two or more ranges based on the detected overlap points;

a range resolution module 624 for resolving a plurality of ranges by detecting when two ranges have the exact same key range and selecting the more recent of the two ranges; and a range merger module 626 for detecting when two ranges have an adjacent key range, such as [k1, k5] and [k6, k9], determining if the two adjacent key ranges have the same associated value; and, if the two ranges do have the same associated value, merging the two adjacent ranges into a single range;

a temporal ordering module 628 for determining, based on available time/date information, which value associated with a key range is the most recent; and a compaction module 630 for, after the range merging module 618 has merged a plurality of immutable data tables into a single merged view, writing the data from the merged view into a new, immutable data table and deleting the original immutable data tables; and one or more server data module(s) 632 for storing data related to the data storage server 300, including but not limited to:

data request buffer 634 including data received from data store, modify, or delete requests which has not yet been written to an immutable data table 636 because the required criteria has not been satisfied; wherein the data is stored as key range value pairs;

immutable data tables 636 including one or more immutable data tables, each data table holding one or more key ranges and an associated value; the key ranges also including date/time information;

data request log 640 including a log of all add, modify, and delete data requests received by the data storage server 300.

Figure 7:
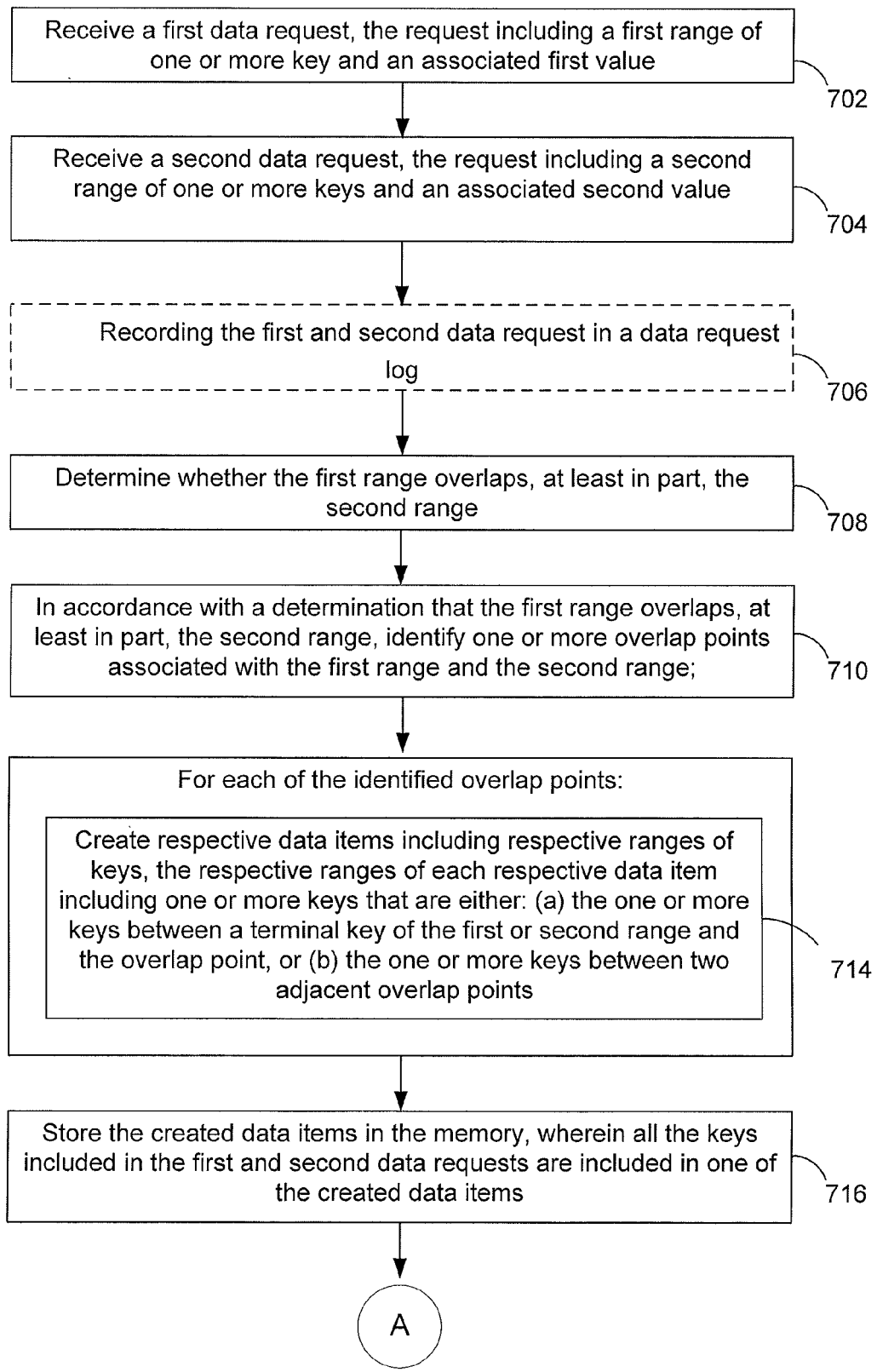
FIG. 7 is a flow diagram illustrating the process of resolving overlaps between key ranges in accordance with some implementations.

FIG. 7 is a flow diagram illustrating the process of resolving overlaps between key ranges in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the data storage server (FIG. 3, 300).

In accordance with some implementations, the data storage server (FIG. 3, 300) receives=first data request, the request including a first range of one or more keys and an associated first value (702). In some implementations the associated value is a deletion marker. The data storage server (FIG. 3, 300) then receives a second data request, the request including a second range of one or more keys and an associated second value. (704). A data request is any request to add data, delete data, modify data, or read data stored in the data storage server (300). Read requests will only include the key value to be read, without an accompanying associated value. In some implementations, delete requests are formatted identically to modify data requests, with the associated value set to a deletion marker (for example DEL). In some implementations the first and second data requests are stored in a data request log (706).

In some implementations the data storage server (FIG. 3, 300) determines whether the keys included in the first range overlap, at least in part, the keys included in the second range (708). For example, if the first range includes keys k1 through k7, and the second range includes the keys k5 through k9, the system would determine that the first range does overlap the second range from key k5 to k7.

In accordance with a determination that the first range overlaps, at least in part, the second range, the data storage server (FIG. 3, 300) identifies overlap points associated with the first range and the second range (710). For example, for the ranges mentioned above ([k1, k7] and [k5, k9]) the data storage server (FIG. 3, 300) identifies k4 and k7 as overlap points.

In accordance with some implementations, the data storage server (FIG. 3, 300) for each of the identified overlap points creates respective data items including respective ranges of keys, the respective ranges of each respective data item including one or more keys that are either: (a) the one or more keys between a terminal key of the first or second range and the overlap point, or (b) the one or more keys between two adjacent overlap points 714. A terminal point, as used herein, is the first or last keys in either of the key ranges. For example, in the ranges [k1, k7] and [k5-k9] k1 and k9 are terminal points. Thus starting at the first terminal point, k1, all the keys between the first terminal point and the next overlap point (k4) form a new range [k1, k4] and are included in a new data item. The next new data item includes the keys from the overlap point to the next overlap point [k7]. This range is now [k5, k7]. The last data items include the keys from the overlap point to the last terminal point, and thus include the keys [k8, k9].

In some implementations the created data items are stored in memory. All the keys that were originally included in the first and second data request are included in one, and only one, of the newly created data items (716).

Figure 8:
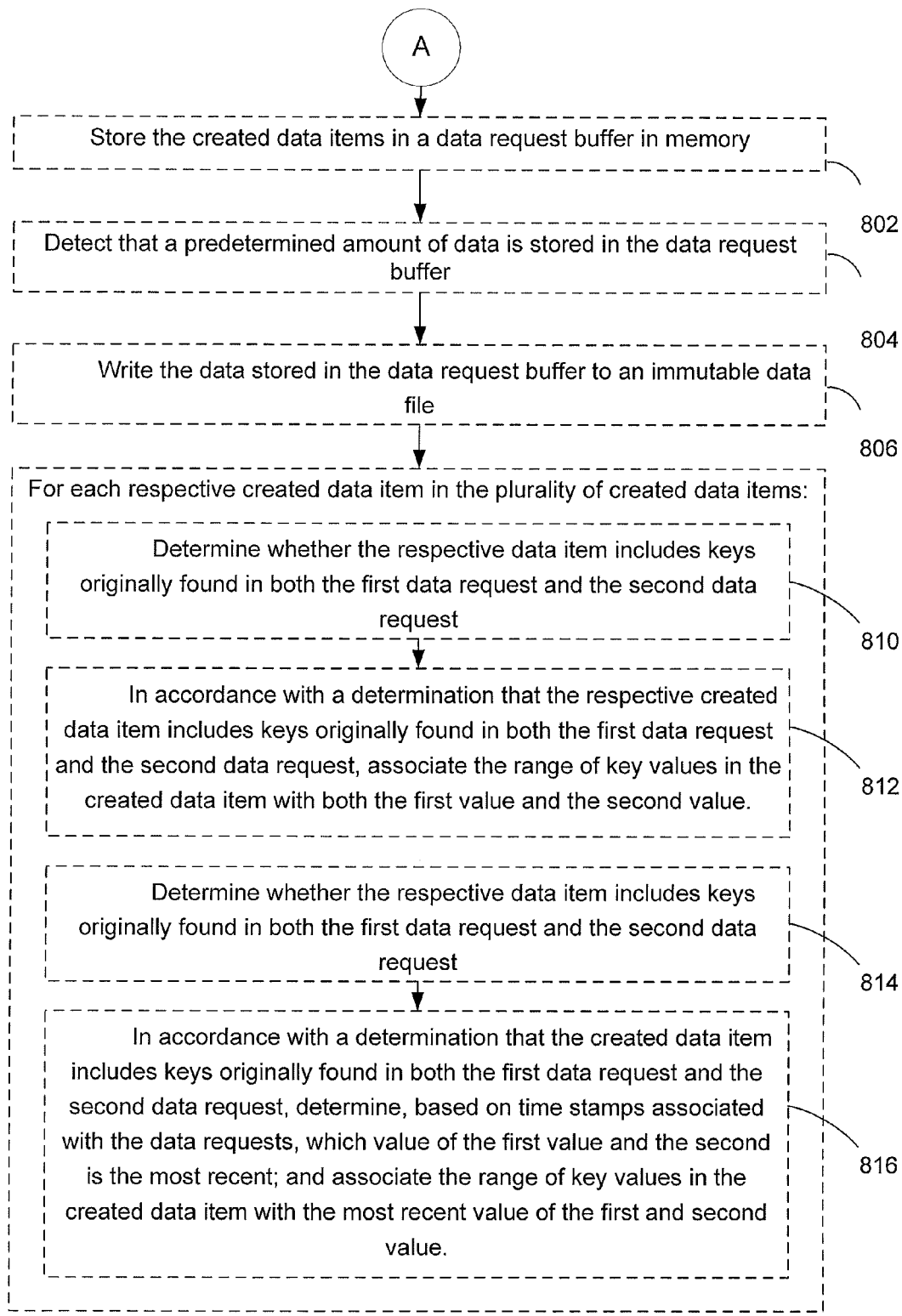
FIG. 8 is a flow diagram illustrating the process of resolving overlaps between key ranges in accordance with some implementations.

FIG. 8 is a flow diagram illustrating the process of resolving overlaps between key ranges in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the data storage server (FIG. 3, 300).

In some implementations newly created data items are stored in a data request buffer in memory (802). In some implementations, the data storage server (FIG. 3, 300) detects a predetermined amount of data is stored in the data request buffer (804). For example, the predetermined amount is a total amount of data (e.g. 10 GB) or a percentage of the available buffer (80 percent). When this predetermined amount is detected, the data storage server (FIG. 3, 300) writes the data stored in the data request buffer to an immutable data table (806).

In some implementations, for each respective created item in the plurality of created data items the data storage server (FIG. 3, 300) determines whether the respective data item includes keys originally found in both the first data request and the second data request (810). For example, for two data requests ranges such as [k1, k6], and [k4, k8], the newly created data items would include the ranges [k1, k3], [k4, k6], and [k7, k8]. The first range is entirely made of keys from the first data request, the second range is made of keys that were in both the first and second data requests, and the third range includes keys only from the second data request. Thus, only the second range would be determined to include keys found in both the first and second data request. In accordance with a determination that the respective created data item includes keys originally found in both the first data request and the second data request, the data storage server (FIG. 3, 300)

associates the range of key values in the created data item with both the first value and the second value (812).

In some implementations, for each respective created item in the plurality of created data items the data storage server (FIG. 3, 300) determines whether the respective data item includes keys originally found in both the first data request and the second data request (814). For example, for two data requests ranges such as [k1, k6], and [k4, k8], the newly created data items would include the ranges [k1, k3], [k4, k6], and [k7, k8]. The first range is entirely made of keys from the first data request, the second range is made of keys that were in both the first and second data requests, and the third range includes keys only from the second data request. Thus, only the second range would be determined to include keys found in both the first and second data request. In accordance with a determination that the respective created data item includes keys originally found in both the first data request and the second data request, the data storage server (FIG. 3, 300) determines, based on time stamps associated with the data requests, which value of the first value and the second is the most recent; and associate the range of key values in the created data item with the most recent value of the first and second value (816).

Figure 9:
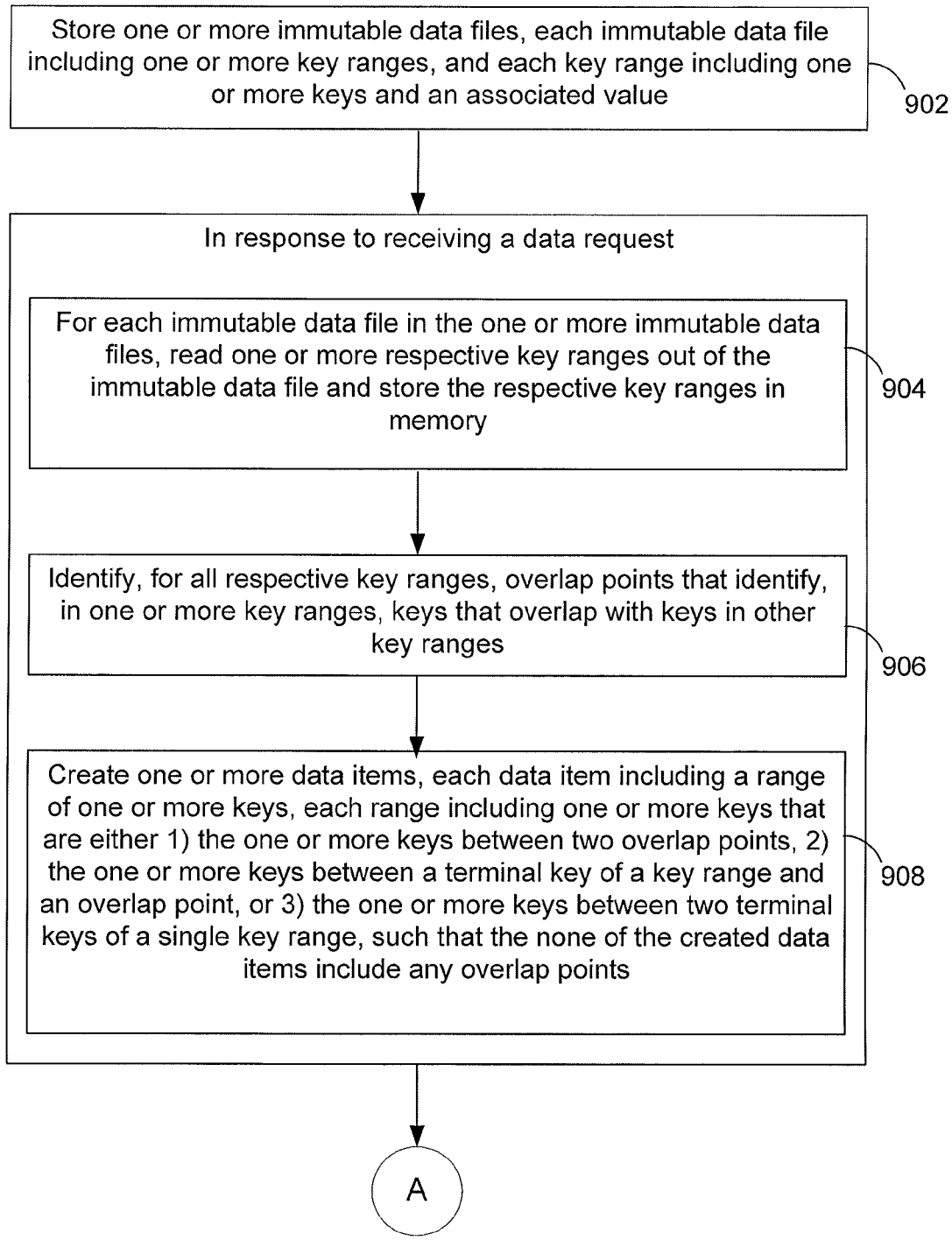
FIG. 9 is a flow diagram illustrating the process of resolving overlaps between key ranges when performing a merge in accordance with some implementations.

FIG. 9 is a flow diagram illustrating a process of resolving overlaps between key ranges when performing a merge in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the data storage server (FIG. 3, 300).

In some implementations the data storage server (FIG. 3, 300) stores one or more immutable data files, each immutable data file including one or more key ranges, and each key range includes one or more keys and an associated value (902). In response to a data request, the data storage server (FIG. 3, 300) reads, for each immutable data file in the one or more immutable data files; one or more respective key ranges out of the immutable data file and store the respective key ranges in memory (904). The data storage server (FIG. 3, 300) identifies for all respective key ranges, overlap points that identify, in one or more key ranges, keys that overlap with keys in other key ranges (906).

In some implementations, the data storage server (FIG. 3, 300) creates one or more data items, each data item including a range of one or more keys, each range including one or more keys that are either 1) the one or more keys between two overlap points, 2) the one or more keys between a terminal key of a key range and an overlap point, or 3) the one or more keys between two terminal keys of a single key range, such that the none of the created data items include any overlap points. For example if a first range includes keys k1-k7 and a second range includes keys k4-k12, the data storage server would create a first new data item 406 that includes keys k1-k3, a second new data item 408 that includes keys k4-k7, and a third new data item 410 that includes keys k8-k12.

Figure 10:
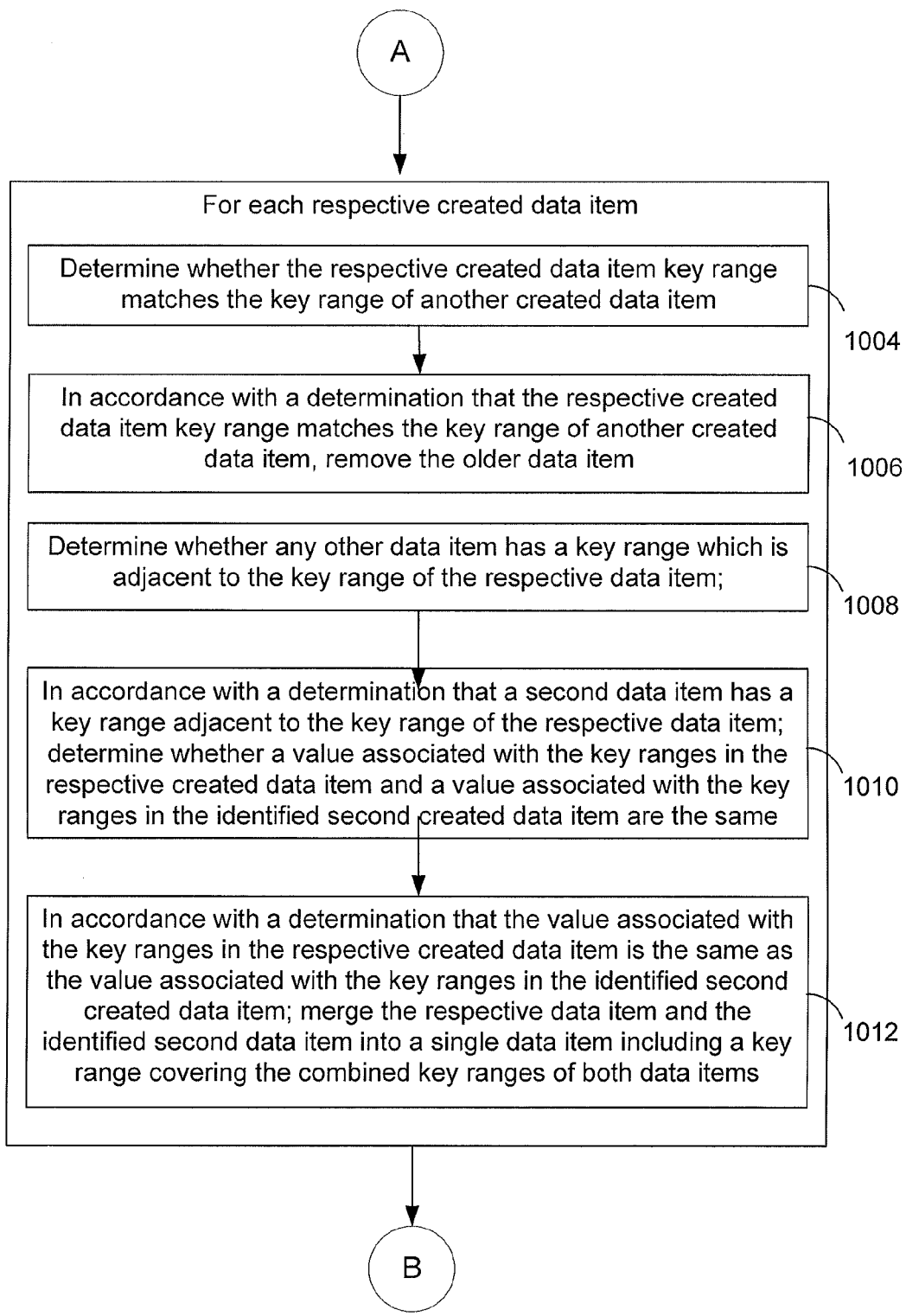
FIG. 10 is a flow diagram illustrating the process of resolving overlaps between key ranges when performing a merge in accordance with some implementations.

FIG. 10 is a flow diagram illustrating a process of resolving overlaps between key ranges when performing a merge in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the data storage server (FIG. 3, 300).

In some implementations, for each respective created new data item the data storage server (FIG. 3, 300) determines whether the respective created data item key range matches the key range of another created data item (1004). In accordance with a determination that the respective created data item key range matches the key range of another created data item, the data storage server (FIG. 3, 300) removes the older data item (1006).

In some implementations, for each respective created new data item the data storage server (FIG. 3, 300) determines whether any other data item has a key range which is adjacent to the key range of the respective data item (1008). In accordance with a determination that a second data item has a key range adjacent to the key range of the respective data item; the data storage server (FIG. 3, 300) determines whether a value associated with the key ranges in the respective created data item and a value associated with the key ranges in the identified second created data item are the same (1010). In accordance with a determination that the value associated with the key ranges in the respective created data item is the same as the value associated with the key ranges in the identified second created data item; the data storage server (FIG. 3, 300) merges the respective data item and the identified second data item into a single data item including a key range covering the combined key ranges of both data items (1012).

Figure 11:
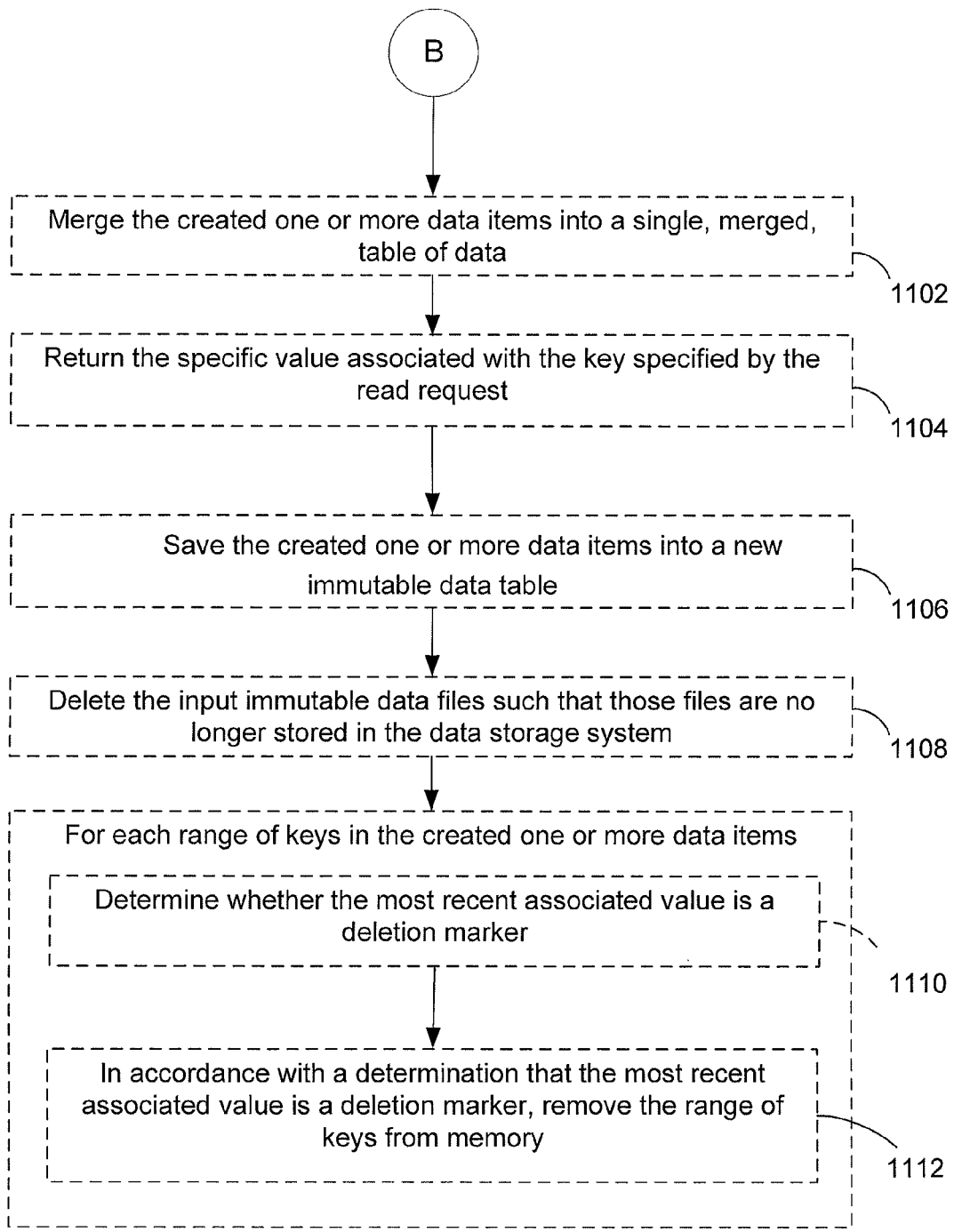
FIG. 11 is a flow diagram illustrating the process of resolving overlaps between key ranges when performing a merge in accordance with some implementations.

FIG. 11 is a flow diagram illustrating the process of resolving overlaps between key ranges when performing a merge in accordance with some implementations. Each of the operations shown in FIG. 11 may correspond to instructions stored in a computer memory or computer readable storage medium. Optional operations are indicated by dashed lines (e.g., boxes with dashed-line borders). In some implementations, the method described in FIG. 11 is performed by the data storage server (FIG. 3, 300).

In some implementations, the data storage server (FIG. 3, 300) merges created one or more data items into a single, merged, table of data (1102). The data storage server (FIG. 3, 300) then returns the specific value associated with the key specified by the read request (1104).

In some implementations, the data storage server (FIG. 3, 300) saves the created one or more data items into a new immutable data table (1106). The data storage server (FIG. 3, 300) then deletes the input immutable data files such that those files are no longer stored in the data storage system (1108).

In some implementations, for each range of keys in the created one or more data items, the data storage server (FIG. 3, 300) determines whether the most recent associated value is a deletion marker (1110). In accordance with a determination that the most recent associated value is a deletion marker, the data storage server (FIG. 3, 300) then removes the range of keys from memory (1112).

The methods illustrated in FIGS. 7-11 may be governed by instructions that are stored in a computer readable storage medium and that are executed by at least one processor of at least one server. Each of the operations shown in FIGS. 7-11 may correspond to instructions stored in a non-transitory computer memory or computer readable storage medium. In various implementations, the non-transitory computer readable storage medium includes a magnetic or optical disk storage device, solid state storage devices such as Flash memory, or other non-volatile memory device or devices. The computer readable instructions stored on the non-transitory computer readable storage medium may be in source code, assembly language code, object code, or other instruction format that is interpreted and/or executable by one or more processors.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method for storing data, comprising:
    on an electronic system having one or more processors and memory storing data and one or more programs for execution by the one or more processors:
        receiving a first data request, the request including a first range of one or more keys and an associated first value;
        receiving a second data request, the request including a second range of one or more keys and an associated second value;
        determining whether the first range overlaps, at least in part, the second range;
        in accordance with a determination that the first range overlaps, at least in part, the second range, identifying one or more overlap points associated with the first range and the second range;
        for each of the identified overlap points,
            creating respective data items including respective ranges of keys, the respective ranges of each respective data item including one or more keys that are either: (a) the one or more keys between a terminal key of the first or second range and the overlap point, or (b) the one or more keys between two adjacent overlap points; and
        storing the created data items in the memory, wherein all the keys included in the first and second data requests are included in one of the created data items.

2. The method of claim 1, further comprising:
    recording the first and second data request in a data request log.

3. The method of claim 1, wherein the created data items in memory are stored in a data request buffer.

4. The method of claim 3, further comprising:
    detecting when a predetermined amount of data is stored in the data request buffer; and
    writing the data stored in the data request buffer to an immutable data file.

5. The method of claim 1, wherein the first value associated the first with the first range of one or more keys is a deletion marker.

6. The method of claim 1, further comprising:
    for each respective created data item in the plurality of created data items:
        determining whether the respective created data item includes keys originally found in both the first data request and the second data request;
        in accordance with a determination that the respective created data item includes keys originally found in both the first data request and the second data request, associating the range of key values in the created data item with both the first value and the second value.

7. The method of claim 1, wherein each data request includes a time stamp.

8. The method of claim 1, further comprising:
    for each respective created data item in the plurality of created data items:
        determining whether the respective created data item includes keys originally found in both the first data request and the second data request;

in accordance with a determination that the respective created data item includes keys originally found in both the first data request and the second data request:
determining, based on time stamps associated with the data requests, which value of the first value and the second is the most recent; and
associating the range of key values in the created data item with the most recent value of the first and second value.

9. A method for data storage and retrieval, comprising:
on an electronic system having one or more processors and memory storing data and one or more programs for execution by the one or more processors:
storing one or more immutable data files, each immutable data file including one or more key ranges, and each key range including one or more keys and an associated value;
in response to receiving a data request:
for each immutable data file in the one or more immutable data files:
reading one or more respective key ranges out of the immutable data file and storing the respective key ranges in memory;
identifying, for all the respective key ranges, overlap points that identify, in one or more key ranges, keys that overlap with keys in other key ranges;
creating one or more data items, each data item including a range of one or more keys, each range including one or more keys that are either 1) the one or more keys between two overlap points, 2) the one or more keys between a terminal key of a key range and an overlap point, or 3) the one or more keys between two terminal keys of a single key range, such that the none of the created data items include any overlap points;
for each respective created data item:
determining whether the respective created data item key range matches the key range of another created data item;
in accordance with a determination that the respective created data item key range matches the key range of another created data item, removing the older data item;
determining whether any other data item has a key range which is adjacent to the key range of the respective data item;
in accordance with a determination that a second data item has a key range adjacent to the key range of the respective data item; determining whether a value associated with the key ranges in the respective created data item and a value associated with the key ranges in the identified second created data item are the same; and
in accordance with a determination that the value associated with the key ranges in the respective created data item is the same as the value associated with the key ranges in the identified second created data item:
merging the respective data item and the identified second data item into a single data item including a key range covering the combined key ranges of both data items.

10. The method of claim 9, wherein the data request is a read request for a value associated with a key stored in the immutable data files.

11. The method of claim 10, further including:
merging the created one or more data items into a single, merged, table of data, and returning the specific value associated with the key specified by the read request.

12. The method of claim 9, wherein the data request is a compaction request.

13. The method of claim 12 further comprising:
saving the created one or more data items into a new immutable data file; and
deleting the immutable data files such that those data files are no longer stored on the data storage system.

14. The method of claim 9, wherein at least one value associated with at least on range of one or more keys is a deletion marker.

15. The method of claim 14, further comprising:
for each range of one or more keys in the created one or more data items:
determining whether the most recent associated value is a deletion marker; and
in accordance with a determination that the most recent associated value is a deletion marker, removing the range of keys from memory.

16. The method of claim 9, further comprising:
for each respective created data item in the plurality of created data items:
determine whether the respective created data item includes keys originally found more than one key range;
in accordance with a determination that the respective created data item includes keys originally found in more than one key range, associating the range of key values in the created data item with the all the values associated with the more than one key ranges.

17. The method of claim 9, wherein each key range includes a time stamp.

18. The method of claim 17, further comprising:
for each respective created data item in the plurality of created data items:
determining whether the respective created data item includes keys originally found in both the first data request and the second data request;
in accordance with a determination that the respective created data item includes keys originally found in both the first data request and the second data request;
determining, based on time stamps associated with the data requests, which value of the first value and the second value is the most recent; and
associating the range of key values in the created data item with the most recent value of the first and second value.

19. A data storage server system for storing data, comprising:
one or more processors;
memory storing one or more programs to be executed by the one or more processors;
the one or more programs comprising instructions for:
receiving a first data request, the request including a first range of one or more keys and an associated first value;
receiving a second data request, the request including a second range of one or more keys and an associated second value;
determining whether the first range overlaps, at least in part, the second range;
in accordance with a determination that the first range overlaps, at least in part, the second range, identifying one or more overlap points associated with the first range and the second range;

for each of the identified overlap points,
  creating respective data items including respective ranges of keys, the respective ranges of each respective data item including one or more keys that are either: (a) the one or more keys between a terminal key of the first or second range and the overlap point, or (b) the one or more keys between two adjacent overlap points; and
  storing the created data items in the memory, wherein all the keys included in the first and second data requests are included in one of the created data items.

20. The system of claim 19, the one or more programs further including instructions for:
  recording the first and second data request in a data request log.

* * * * *